US010755303B2

(12) United States Patent
Trevisiol et al.

(10) Patent No.: US 10,755,303 B2
(45) Date of Patent: Aug. 25, 2020

(54) GENERATING ACTIONABLE SUGGESTIONS FOR IMPROVING USER ENGAGEMENT WITH ONLINE ADVERTISEMENTS

(71) Applicant: Yahoo Holdings, Inc., Sunnyvale, CA (US)

(72) Inventors: Michele Trevisiol, Verona (IT); Gabriele Tolomei, London (GB); Nicola Barbieri, London (GB); Mounia Lalmas, Essex (GB); Puneet Mohan Sangal, Cupertino, CA (US); Fabrizio Silvestri, London (GB)

(73) Assignee: Oath Inc., New York, NY (US)

( * ) Notice: Subject to any disclaimer, the term of this patent is extended or adjusted under 35 U.S.C. 154(b) by 704 days.

(21) Appl. No.: 14/954,118

(22) Filed: Nov. 30, 2015

(65) Prior Publication Data

US 2017/0154356 A1  Jun. 1, 2017

(51) Int. Cl.
*G06Q 30/00* (2012.01)
*G06Q 30/02* (2012.01)

(52) U.S. Cl.
CPC ..... *G06Q 30/0246* (2013.01); *G06Q 30/0242* (2013.01); *G06Q 30/0272* (2013.01); *G06Q 30/0277* (2013.01)

(58) Field of Classification Search
CPC .................................................. G06Q 30/00
USPC .......................................................... 705/14
See application file for complete search history.

(56) References Cited

U.S. PATENT DOCUMENTS

| 2007/0156514 A1 | 7/2007 | Wright et al. | |
| 2007/0156887 A1* | 7/2007 | Wright | G06Q 30/02 709/224 |
| 2008/0065620 A1* | 3/2008 | Chopra | G06Q 30/02 |
| 2011/0054999 A1* | 3/2011 | Attenberg | G06Q 30/02 705/14.43 |
| 2012/0253927 A1* | 10/2012 | Qin | G06Q 30/0241 705/14.49 |
| 2015/0213481 A1* | 7/2015 | Yuan | G06Q 30/0244 705/14.43 |

FOREIGN PATENT DOCUMENTS

| GB | 2425195 A | * 10/2006 | ............. G06Q 10/00 |
| WO | WO 2007/079405 A2 | 7/2007 | |

OTHER PUBLICATIONS

Amanda Gant, "15 Ways to Improve Your Website Today", May 8, 2015, www.OrbitMedia.com, printed through www.archive org (Year: 2015).*
Clare Dodd, "15 Ways to Improve Your Home Page", Apr. 10, 2013, www.ArticulateMarketing.com (Year: 2013).*
(Continued)

*Primary Examiner* — Naresh Vig
(74) *Attorney, Agent, or Firm* — Cooper Legal Group, LLC (57) ABSTRACT

An online advertising system receives an advertisement from an advertiser. The system analyzes the advertisement, extracts its features and provides to the advertiser a quality rating for the advertisement which depends on a user engagement factor such as the predicted dwell time for the ad, given its features. The system further provides to the advertiser suggestions for improvements to the advertisement, such as a list of actionable guidelines that can improve the expected dwell time of the ad, and likely its conversion rate.

13 Claims, 5 Drawing Sheets

(56) References Cited

OTHER PUBLICATIONS

Content Analysis Documentation for Yahoo! Search, Yahoo Groups Discussions, 3pp., Nov. 1, 2015.
Terence Mace, Content Quality Score: Google's Best Kept Secret for Rankings, Google's Content Quality Score-Mace Dynamics, 18pp., Sep. 18, 2014.
Bill Slawski, Patent Applications on Estimating, Rating and Using Quality Scores for Google Ads, SEO by the Sea, 10pp., Jul. 6, 2007.
http://www.wordstream.com/quality-score, 7pp., downloaded Nov. 9, 2015.

* cited by examiner

Input:
$X_1, X_2, \ldots, X_m$; // $m$ random variables representing the dwell time, one for each ad in a specific YCT category
$\{X_{i,1} = x_{i,1}, X_{i,2} = x_{i,2}, \ldots, X_{i,n_i} = x_{i,n_i}\}$; // for each $X_i$ we have access to a sample of $n_i$ observations of dwell time
$q$; // $q$-th percentile
$B$; // number of bootstrap iterations
$\alpha$; // level of significance

Output: Confidence Interval of $q$ at $(1 - \alpha)$ level of significance

Init:
$x_{q_i} = \{x \mid P(X_i \leq x) = q/100\} \; \forall i \in \{1, \ldots, m\}$; // compute the $q$-th percentiles of all the original samples $X_1, X_2, \ldots, X_m$
$\hat{x}_q = \text{Med}(\{x_{q_i}\}_{i=1,\ldots,m})$; // take the median of all the $x_{q_i}$ as a single point estimate of the $q$-th percentile
$Q = \text{array}[B]$; // initialize an array to store the $B$ bootstrap estimates of the $q$-th percentile
$b = 1$;

while $b \leq B$ do

$X_1^{(b)}, \ldots, X_m^{(b)}$; // take a random sample from each original sample
    $x_{q_1}^{(b)}, \ldots, x_{q_m}^{(b)}$; // compute the $q$-th percentiles of all the bootstrap samples
    $\hat{x}_q^{(b)} = \text{Med}(\{x_{q_i}^{(b)}\}_{i=1,\ldots,m})$; // take the median of the all the $x_{q_i}^{(b)}$
    $Q[b] \leftarrow \hat{x}_q^{(b)}$ // store the $b$-th bootstrap estimate in the array $Q$
    $b \leftarrow b + 1$;

end

$\text{Avg}(Q); \text{StdErr}(Q)$; // compute the average and the standard error from the $B$ bootstrap estimates of the $q$-th percentile
$\epsilon \leftarrow z * \text{StdErr}(Q)$ // $z$ is the critical value of a random variable $Z \sim \mathcal{N}(0,1)$, such that $P(Z \leq z) = 1 - \alpha/2$
return $(\hat{x}_q - \epsilon, \hat{x}_q + \epsilon)$

Figure 5

GENERATING ACTIONABLE SUGGESTIONS FOR IMPROVING USER ENGAGEMENT WITH ONLINE ADVERTISEMENTS

BACKGROUND

The present application relates generally to data communication systems. More particularly, the present invention relates to systems and methods for generating suggestions for improvement for sponsors of online websites and web pages, and to communicating such suggestions over a network, for improving user engagement with electronic advertisements communicated over a network to users.

Current online systems collect information of interest to users and make that information available to users. A system operator, such as Yahoo! Inc., makes the information available to users over computer networks. The information may be presented in one or more web pages accessed by a web browser on a user's computer, smartphone, tablet or other device over a network. The information may be accessed by use of a search engine, by hyper-linked web pages to be explored by the user, or by other means. Such information may include advertisements about products and services or possible interest to the users. An advertisement may be clicked or otherwise selected by a user to learn more about the advertised product or service.

It has been difficult to reliably gauge the interest of users in online advertisements. The click or click through itself indicates interest and click are routinely reported back to the system operator. Some advertisements invite a user to view a video or provide personal information such as an email address or to make a purchase, including providing credit card information. All of these actions, if taken by a user, provide useful information.

However, if these actions are not taken by the user, little or no information is provided to the system operator or the advertiser. No information is provided about the effectiveness or user engagement provided by the advertisement. No conclusions can be drawn about how to improve the advertisement. Even in the case of positive engagement, such as a completed purchase, no conclusions can be made about how to improve the advertisement and no suggestions about improvement can be made to the advertiser.

SUMMARY

The current disclosure and its embodiments provide a way to measure user engagement with an advertisement. In particular, the user's interaction with the landing page of the ad is measured or estimated. Given an ad and its landing page, one goal of the disclosed method and system is to provide first a rating indicative of ad-quality which measures the expected or predicted degree of engagement of users with the considered ad. Secondly, it provides a set of suggestions to the advertisers for their ads. These suggestions reflect the improvements that can be applied on the format of the landing page to promote user engagement.

As an example, define the target number of images on a page to be 3±1. Given a new ad, if its landing page has 5 or more images, the system will generate a suggestion such as "Overwhelming content: try to reduce the number of images." On the other hand, if its landing page has 1 or no images at all, the system will generate the suggestion such as "Improving aesthetics: try to increase the number of images." The suggestions are focused on items the advertiser can readily change and which will have a meaningful impact for the end user.

Different metrics can be exploited to measure the engagement of users with ads. Rather than considering conventional benchmarking metrics based on click through rate (CTR), the disclosed system and method focus on dwell time, i.e., the average number of seconds consumers intentionally spend engaging with an online ad. Dwell time is in fact a better indicator for conversion than CTR. The more time a user spends on an ad, the more likely he will convert, where conversion includes consuming the content, purchasing the product, enrolling in the mailing list, etc. Dwell time is also naturally connected to another important metric, the bounce rate. Bounce rate measures the percentage of users who land on a page associated with an ad, and then leave without going through the content. While CTR focuses on measuring the intensity of traffic, dwell time and bounce rate measure the quality of the traffic. Moreover, since the dwell time is a post-click metric, it implicitly takes into account the clicks, thus, we can state that the dwell time is better suited as a proxy for user engagement.

The proposed framework leverages historical data recording past interactions between users, ads and their features to understand, by means of statistical analysis, which are the main relationships between the features of the ads and the rate of user engagement. More specifically, the advertisers may submit an ad to the system, which analyzes its content, extracts features and provides feedback to the advertiser. First, the system provides a quality rating for the ad, which depends on the predicted dwell time for the ad, given its features. Second, the system provides suggestions for improvements, which in some embodiments is a list of actionable guidelines that can improve the expected dwell time of the ad, and likely the conversion rate.

These and other advantages, aspects and novel features of the present disclosure, along with details of illustrated embodiments thereof, will be more fully understood from the following description and drawings.

BRIEF DESCRIPTION OF THE DRAWINGS

FIG. 5 illustrates an algorithm which evaluates the confidence interval for a dwell time distribution.

DETAILED DESCRIPTION OF THE DRAWINGS AND THE PRESENTLY PREFERRED EMBODIMENTS

The disclosed system and method relate to providing web page data over networks to end user computers. Some web page data includes advertisement data that defines advertisements that appear on the web page. Some web pages may involve sponsored search in which websites are promoted by increasing their visibility among search results produced by a search engine. The advertisements are ordered among the search results using factors such as relevancy and amounts paid by sponsored or promoters of the advertisements or advertisers.

Ranking of online advertisements is affected by techniques to determine relevancy of ads. In sponsored search, this is commonly reflected by showing an ad quality score or rating with search queries keywords. The keyword is received over the network from an end user device and reflects a topic of interest to the user. In a search engine, search results are returned with sponsored search advertisements.

Native advertising poses new challenges. Native advertising is a type of online advertising that matches the form and function of the platform on which it appears. An example is an article written by an advertiser to promote a product on a website and using form similar to the form of other articles on the website written by the editorial staff or other authors. In native advertising, the word native refers to the content's coherence with other media on the platform. In native advertising, ads are directly integrated with the content of a publisher or social media platform; they are not associated with search queries but rather presented as content that readers can directly enjoy.

Ad-quality rating on sponsored search ads has been computed as a measure of relevancy between the ad and the context in which it is shown, triggered by a user's query. However, in the case of native and display ads, the user query and the bid terms are not available. Therefore, the computation of the score is much less trivial. In general, the quality rating for the ads should promote ads that are interesting, entertaining and visually engaging. The structure of the landing page becomes critical.

Some aspects of the present disclosure are able to compute an ad quality score for any landing page, and therefore for any type of ad. This includes native ads, display ads and other online ads as well. Estimating the quality of ads is important first to promote high quality content that enhances user's engagement with the hosting platform, e.g. news feed, and second systematically detect low-quality ads that, in the long term, could negatively affect users' experience.

The embodiments described herein may be used with any online advertising model. Pay Per Performance (PPF) models such as Pay Per Click (PPC) and Pay Per Action (PPA) are very popular with online advertisers. With the former model, the advertiser is charged only if a user ends up clicking on the advertiser's ad, thereby being redirected to a designated ad landing page and thus visiting the advertiser's web site. In the latter model, instead, the advertiser will pay only when a user accomplishes a pre-defined action (often referred to as conversion), such as subscribing to a mailing list, filling a form, watching a video, etc. The PPA model requires an additional effort from the user, but in many ways, the PPA model better fits the advertiser's needs because it provides useful feedback about user engagement with the advertisement or website. Also, the PPA model is economically more rewarding for the ad provider.

The user's interaction with the landing page can provide information about the success or appropriateness of an advertisement shown to a user. Excluding those cases where a user clicks on an ad by mistake or when there is a complete lack of interest in the ad, such as due to ineffective ad targeting, the user is generally interested in the ad she has clicked on, and therefore in the content of the advertiser's web page. In these cases, the effectiveness of the PPC model and the PPA model is strongly related to the relative quality of the ad landing page. Indeed, the user's post-click satisfaction highly depends on the user's perception of the quality of the ad landing page. Exposing users to poor quality web pages may lead to a drop of click-through rate in the PPC pay per click model or conversion rate in the PPA model. Generally, the same analysis and conclusions apply to native advertising as are described here for sponsored advertising. That is, better quality landing pages will improve the effectiveness of native ads. To address this issue, a proper estimate of the quality of the ad landing page becomes crucial.

In some embodiments, the present disclosure provides an innovative technique to generate actionable feedback to online advertisers which the online advertisers may use for monitoring and improving the post-click performance of their running ads. These embodiments are based on estimating an ad quality rating which measures the engagement of the users with the landing page. In embodiments, the dwell time may be used as our reference post-click engagement metric. Dwell time is the time spent by a user on an ad landing page. Moreover, it has been observed that dwell times observed for similar ad landing pages exhibit a similar underlying behavior. Informally, two ad landing pages are defined herein as similar if they refer to the same topic, which in our solution is captured using a content analysis web service.

One such content analysis web service is available online from Yahoo! Inc., Sunnyvale, Calif., and referred to as Yahoo Context Taxonomy (YCT). YCT receives a query as input and returns information about entities and concepts, categories and relationships within unstructured content identified by the query, such as one or more web pages. YCT ranks those entities and concepts by their overall relevance and annotates tags with relevant metadata. While YCT is used to illustrate the embodiments described herein, it represents only one example of a content analysis web service. Other similar services may be used as well or in addition.

One of the main advantages of the proposed approach is its wide applicability to several online properties. Indeed, the quality score is computed from the ad landing page features and the historical user behavior, and can be attached to in-stream native ads, sponsored search, display ads, etc.

Apart from accidental clicks, it is expected that users will be interested in the content of the ads they click on. The user's post-click satisfaction highly depends on whether the perceived quality of the ad landing page, or the user's experience, meets the message conveyed by the advertising creative and foreseen before clicking, or the user's expectation. Therefore, it is important to estimate the quality of an ad landing page. This information might be strategic for the ad re-ranking process. Giving priority to ads that have higher quality ratings improves user satisfaction, and as a by-product, improves user long-term engagement.

Moreover, the benefit of revealing such quality rating to the advertisers is two-fold. On one hand, advertisers can monitor the quality of their ads and then improve the effectiveness of their running campaigns with respect to those of their competitors. On the other hand, having the ad quality rating provided by the publisher or system operator allows advertisers to increase their trustworthiness with the publisher or system operator.

However, estimating ad landing page quality represents a difficult challenge which has not been successfully addressed so far. Each ad landing page may differ significantly from each other ad landing page, not only by content and structure but also by the user interface. The user interface in this context refers to all possible key factors for engaging users and guiding them towards the action desired by the advertiser. User interface features may include, for example, features which have been optimized for viewing on a mobile device such as a smartphone, appropriate amounts of text and graphics, etc. The proposed methodology takes into account the behavior of the users as measured with historical post-click metrics such as dwell time by the user on the landing page, and also a large set of features that characterize the content and structure of the landing pages. This technique provides a fine-grained rating of any ad landing page. One significant advantage of the disclosed model once trained is its ability to infer the ad quality rating and to generate suggestions for improvement to the advertiser for any new and unseen ads. Since the model needs only the features extracted from the new landing page, it handles by default any cold-start problem, making the model very versatile.

Other advantages are evident as well. First, improving the ad ranking by showing "higher quality" ads to the users translates into a better post click experience, which ultimately may positively impact on the business of the system operator and its advertisers, and provide to users more information of the highest utility to them. Further, the features used for computing the quality rating can be used to provide suggestions to the advertisers on how to improve the weaknesses of their landing pages and therefore the quality of their running ad-campaigns. The ad quality rating thus becomes a type of feedback and enables a loop-fashion approach that drives the advertiser to the necessary improvements of its content, increasing the user satisfaction and therefore the ad publisher business performance.

Referring now to the drawing, one environment in which embodiments may be successfully implemented is described. Then, further details of particular implementations will be discussed in more details.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or, "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
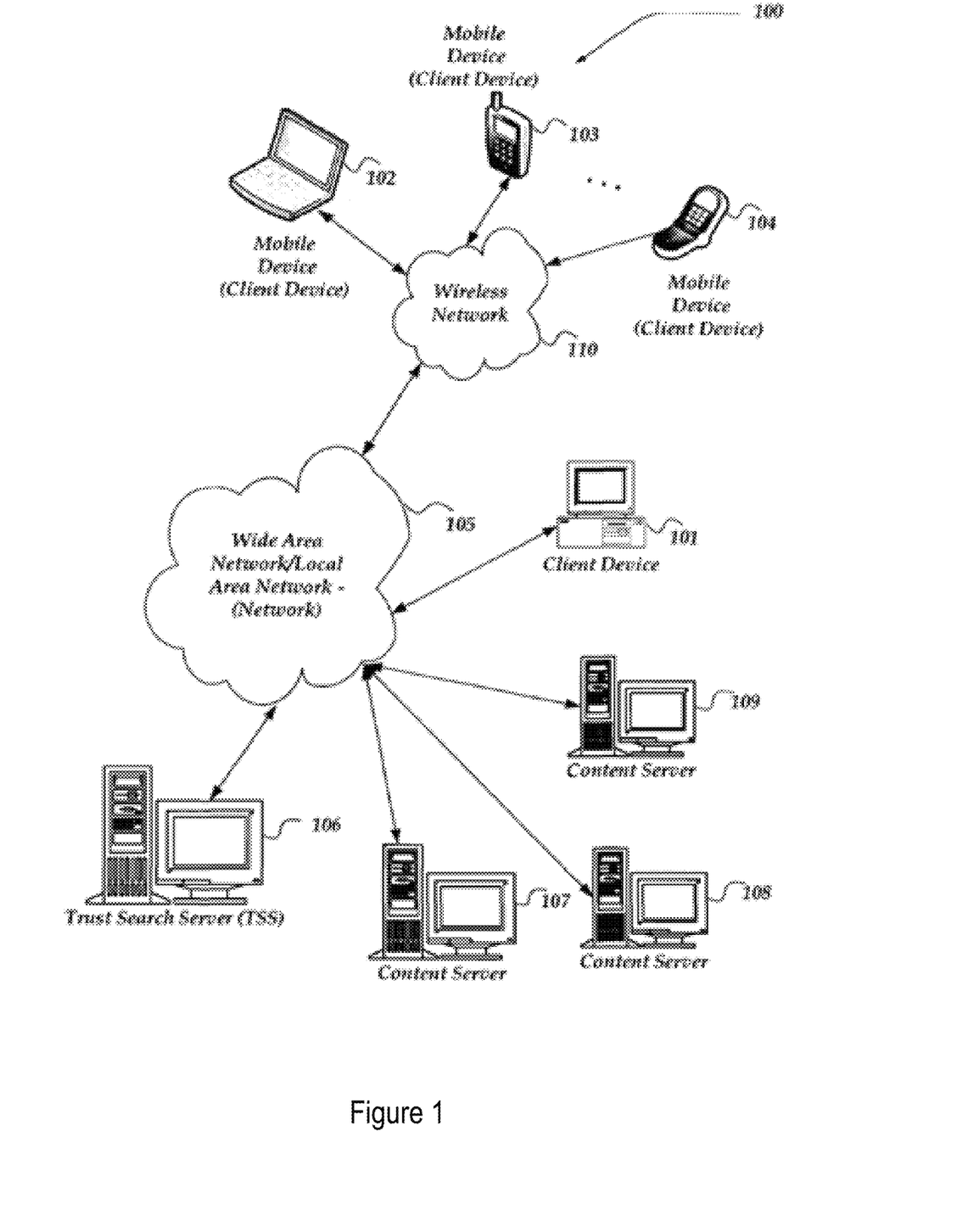
FIG. 1 is a schematic diagram illustrating an example embodiment of a network.

FIG. 1 is a schematic diagram illustrating an example embodiment of a network 100. The network 100 implements an online advertising system. Other embodiments that may vary, for example, in terms of arrangement or in terms of type of components, are also intended to be included within claimed subject matter. As shown, FIG. 1, the network 100 for example, includes a variety of networks, such as local area local area network (LAN)/wide area network (WAN) 105 and wireless network 110, a variety of devices, such as client device 101, mobile device 102, mobile device 103 and mobile device 104, and a variety of servers, such as search server 106, content server 107 and content server 108.

The network 100 is in data communication with several client devices. A client device may include a computing device capable of sending or receiving signals, such as via a wired or a wireless network. A client device may, for example, include a desktop computer such as client device 101 or a portable device, such as a portable computer such as mobile device 102, a smart phone such as mobile device 103, a cellular telephone such as mobile device 104, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. The client devices shown in FIG. 1 are intended to be exemplary only. Any other suitable device may be used in conjunction with the network 100.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color two-dimensional or three-dimensional display, for example.

The client devices may include one or more computing devices. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the devices described herein, or the like.

The network 100 is further in data communication with one or more server computers or servers. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. In the embodiment of FIG. 1, the network 100 includes search server 106 and content servers 107, 108, 109. The network 100 may include other types or arrangements of server systems as well.

The content servers 107, 108, 109 may include a device that includes a configuration to provide content via a network to another device such as one of the client devices illustrated in FIG. 1. The content servers 107, 108, 109 may, for example, host a site, such as a social networking site, examples of which may include, without limitation, Flicker, Twitter, Facebook, LinkedIn, or a personal user site (such as a blog, vlog, online dating site, etc.). The content servers 107, 108, 109 may also host a variety of other sites, including, but not limited to business sites, educational sites, dictionary sites, encyclopedia sites, wikis, financial sites, government sites, etc.

The content servers 107, 108, 109 may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc. A server and a client device as illustrated in FIG. 1 may include various circuits or circuitry operable to perform the functions described in here to be performed by such a client device. The methods, devices, processing, circuitry, and logic described herein for a client device may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dice in a common package, as examples.

The network 100 in the embodiment of FIG. 1 includes WAN/LAN 105 and a wireless network 110. A network such as the WAN/LAN 105 or the wireless network 110 may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

The network 100, including the WAN/LAN 105 and the wireless network 110 communicate data over communication links or channels. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The wireless network 110 may couple client devices such as mobile device 102, 103, 104 with a network such as the WAN/LAN 105. The wireless network 110 may employ stand-alone ad-hoc networks, mesh networks, Wireless LAN (WLAN) networks, cellular networks, or the like.

The wireless network 110 may further include a system of terminals, gateways, routers, or the like coupled by wireless radio links, or the like, which may move freely, randomly or organize themselves arbitrarily, such that network topology may change, at times even rapidly. The wireless network 110 may further employ a plurality of network access technologies, including Long Term Evolution (LTE), WLAN, Wireless Router (WR) mesh, or second, third, or fourth generation (2G, 3G, or 4G) cellular technology, or the like. Network access technologies may enable wide area coverage for devices, such as client devices with varying degrees of mobility, for example.

In general, the servers 106, 107, 108 are in data communication with the client devices 102, 103, 104 over the Internet. The Internet refers to a decentralized global network of networks. The Internet includes local area networks (LANs) and wide area networks (WANs) such as WAN/LAN 105, wireless networks such as wireless network 110, or long haul public networks that, for example, allow signal packets to be communicated between LANs.

A content delivery network or content distribution network (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, cloud computing, distributed storage, domain name system (DNS) request handling, provisioning, signal monitoring and reporting, content targeting, personalization, or business intelligence. A CDN may also enable an entity to operate or manage another's site infrastructure, in whole or in part.

A peer-to-peer (or P2P) network may employ computing power or bandwidth of network participants in contrast with a network that may employ dedicated devices, such as dedicated servers, for example. However, some networks may employ both as well as other approaches. A P2P network may typically be used for coupling nodes via an ad hoc arrangement or configuration. A peer-to-peer network may employ some nodes capable of operating as both a client device and a server.

The term social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple 1:few associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called virtual persons. An individual's social network may be represented in a variety of forms, such as visually, electronically or functionally. For example, a social graph or socio-gram may represent an entity in a social network as a node and a relationship as an edge or a link.

Individuals within one or more social networks may interact or communicate with other members of a social network via a variety of devices. Multi-modal communication technologies refers to a set of technologies that permit interoperable communication across multiple devices or platforms, such as cell phones, smart phones, tablet computing devices, personal computers, televisions, SMS/MMS, email, instant messenger clients, forums, social networking sites (such as Facebook, Twitter, or Google+), or the like.

In one embodiment, as an individual interacts with a software application, such as an instant messenger or electronic mail application, descriptive content, such in the form of signals or stored physical states within memory, such as, for example, an email address, instant messenger identifier, phone number, postal address, message content, date, time, etc., may be identified. Descriptive content may be stored, typically along with contextual content. For example, how a phone number came to be identified (e.g., it was contained in a communication received from another via an instant messenger application) may be stored as contextual content associated with the phone number. Contextual content, therefore, may identify circumstances surrounding receipt of a phone number such as the date or time the phone number was received, and may be associated with descriptive content. Contextual content, may, for example, be used to subsequently search for associated descriptive content. For example, a search for phone numbers received from specific individuals, received via an instant messenger application or at a given date or time, may be initiated.

Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an item of content or a content item, and may be retrieved from a Web of Objects comprising objects made up of a variety of types of content. The term annotation, as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

A profile builder may initiate generation of a profile, such for users of an application, including a search engine, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example.

A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of search results, such as with respect to a particular user.

Various monetization techniques or models may be used in connection with sponsored search advertising, including advertising associated with user search queries, or non-sponsored search advertising, including graphical or display advertising and native advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goals. For example, models may include, among other things, payment based at least in part on cost per impression or number of impressions, cost per click or number of clicks, cost per action for some specified actions, cost per conversion or purchase, or cost based at least in part on some combination of metrics, which may include online or offline metrics, for example.

A process of buying or selling online advertisements may involve a number of different entities, including advertisers, publishers, agencies, networks, or developers. To simplify this process, organization systems called ad exchanges may associate advertisers or publishers, such as via a platform to facilitate buying or selling of online advertisement inventory from multiple ad networks. The term ad networks refers to aggregation of ad space supply from publishers, such as for provision en masse to advertisers.

For web portals like Yahoo, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

One or more of the content servers 107, 108, 109 may be operated as an ad server. An ad server comprises a server that stores online advertisements for presentation to users. Ad serving refers to methods used to place online advertisements on websites, in applications, or other places where users are more likely to see them, such as during an online session or during computing platform use, for example.

During presentation of advertisements, a presentation system may collect descriptive content about types of advertisements presented to users. A broad range of descriptive content may be gathered, including content specific to an advertising presentation system. Advertising analytics such as user interaction data indicative of a degree of user engagement by a user, for example, dwell time data, may be transmitted to locations remote to an advertising presentation system for storage or for further evaluation. Evaluation may be performed in any suitable location such a content server operating as an analytic server or another server having data processing capabilities. The evaluation of user interaction data may be performed by any circuits or circuitry suitable for performing the functions described herein. Such circuits or circuitry may include communication circuits for receiving and transmitting data, digital processing circuits for processing the data, memory circuits for storing data before and after processing and one or more processor circuits which operate in response to instructions and data to perform the advertising analytic functions described herein. Where advertising analytics transmittal is not immediately available, gathered advertising analytics may be stored by an advertising presentation system until transmittal of those advertising analytics becomes available.

Figure 2:
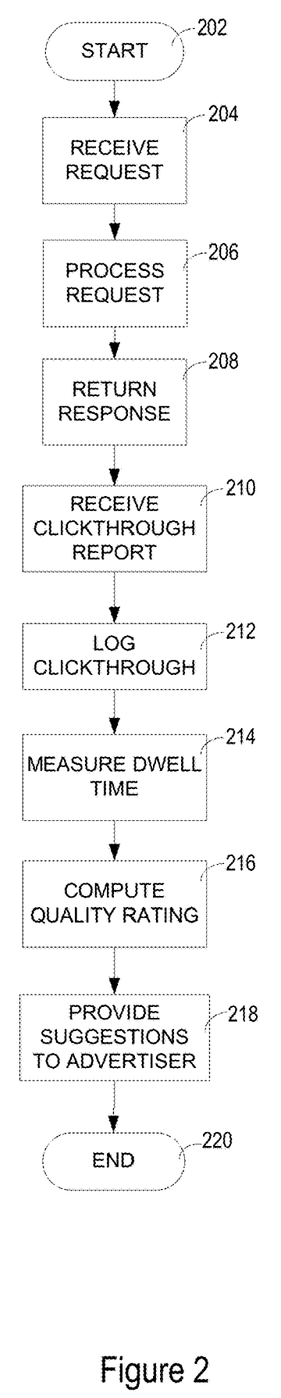
FIG. 2 is a flow chart illustrating exemplary operation of the network of FIG. 1.

FIG. 2 is a flow chart illustrating an example of operation of the network 100 of FIG. 1. The method may be performed at a server such as a content server or other server of the network 100 of FIG. 1. The method includes several steps for collecting data, processing the data and providing feedback. To develop a quality rating for one or more landing pages, the method may be performed repeatedly over an extended time until adequate data has been collected. Alternatively, if data logging has made past data available in a database or other data store, this existing data may be processed as described below.

The method begins at block 202. At block 204, a request is received at the server. In operation, a user of a client device such as client devices 101, 102, 103, 104 requests information from a network device such as the search server 106 or a content server 107, 108, 109. The request may originate with a web browser program operating on the client device. The request may be a search request for search results. Alternatively, the request may be for a web page, media or other content. The request is communicated over the network to the required destination or server, such as the search server 106 or a content server 107, 108, 109.

The server receiving the request processes the request, block 206, and returns a suitable communication, block 208. If the request was a search request directed to the search server 106 for search results, in block 206, the search server 106 returns appropriate search results formatted on a page, block 208. At least some of the search results may be advertisements intended to catch the attention of the user of the client device. If the request was a request for a web page or content, the content server 107, 108, 109 formats the requested web page or content and may include one or more advertisements with the web page or other content, block 206. The advertisements are selected to catch the attention of the user of the client device. The server returns a web page satisfying the request to the client device, block 208

If the user of the client device clicks on one of the advertisements, or otherwise actuates the advertisement, a communication is returned to the server which originated the web page or to another analytic server responsible for logging activity involving advertisements, client devices and users. The server thus receives a click through report, block 210. The click through is logged by the analytic server and the advertiser's account is adjusted as appropriate, block 212. Further, the web browser of the client device is redirected to the landing page of the advertisement. The landing page may be coded in the code of the web page and retrieved by the client device web browser.

In one embodiment, the dwell time at the landing page is measured, block 214. The dwell time may be used to form an estimate of the quality of the landing page, block 216. The dwell time is the time spent by a user on an ad landing page. In practice, the dwell time may be estimated as the delay from the time a user clicks on the ad on the web page being viewed, or the host site, to the time the user returns from the ad landing page to that host site. The time can be estimated using time stamp information in messages sent to the analytic server from the client device. The dwell time thus forms user interaction data indicative of a degree of user engagement by a user in the landing page and thus in the advertisement. Other measures of dwell time may be substituted. Similarly, other measures of user engagement may be used as user interaction data. The analytic server processes dwell time and other information to develop a quality rating for the advertisement.

In some embodiments, the analytic server implements a data-driven approach for inferring a quality rating based on the post-click ad experience, block 216. That is, the quality rating represents a measure of the quality of an ad landing page. This approach considers quality in terms of dwell time, or the time a user is believed to have spent on the landing page after she has clicked on an ad. Although not perfect, dwell time has proven to be an effective proxy measure of the true post-click quality.

System Operation

A technique for computing a quality rating will now be described. To compute a rating that is measurable, comparable, and interpretable, the solution is divided into two stages. Firstly, it assumes that users tend to spend similar amounts of time on ad landing pages that are similar. Note however that the notion of similarity may be captured in different ways. For the moment, informally define two ad landing pages as similar if they belong to the same topical category. More formally, the distribution of observed dwell times is coherent across ad landing pages of the same topical category. Details on validation of this claim are provided below.

Secondly, within the same set of similar ads, there might be those whose dwell time is equal to or significantly lower or higher than expected. This naturally defines three ad quality buckets, designated low, average and high. The low bucket contains all the ads whose observed dwell time is lower than expected, and therefore are performing poorly from a post-click experience standpoint. The average bucket contains all the ads whose observed dwell time is approximately as expected to be on average. The high bucket contains all the ads whose observed dwell time is higher than expected, and therefore performing very well from a post-click experience standpoint. Other techniques for classifying ads may be used instead or in addition, but the use of three buckets provides advantages of reduced processing time and memory storage requirements, as well as enabling production of easy to understand recommendations for the advertiser.

Therefore, three challenges have to be addressed to estimate the ad quality rating. The first challenge is how to group together landing pages that have similar characteristics. The second challenge is how to reliably compute the two critical values to determine the three quality buckets described above. The third challenge is how to automatically classify unseen ad landing pages according to the three quality buckets.

Once a rating is inferred (low, average or high) for a given landing page, a set of suggestions are generated that explain the rating and drive the advertiser to improve the quality of the landing page itself, block 218. In some embodiments, this requires four steps.

A first step is feature categorization. We categorize the features into a set of broader domains to simplify the explanations to the advertisers. One example is mobile optimization, which refers to features that describe how much the web page supports mobile navigation. A second example is multimedia, which refers to features related to the number of images or videos and their size. A third example is textual content, which refers to features about the size of the content, the number of long and short words, etc.

A second step is feature ranging. We compute a confidence interval around the optimal value, such as the median value, of each feature estimated from all ad landing pages falling into the high quality bucket. Intuitively, we want to obtain the range in which the value of each feature should be for a high-quality ad landing page.

A third step is feature comparison. For any new ad landing page, for which we want to provide suggestions, we compare the values of all its features with each expected feature range as computed above. In this way, we provide the advertiser with a list of features ranked by their distance from the optimal value, that is, from the farthest to the nearest. This highlights which are the main weaknesses of the landing page.

The fourth step is feedback assembling. From the comparison above, we phrase actionable suggestions for improvement in natural language. An example of provided suggestion is shown in FIG. 1, where the sentence states the action required to improve the specific feature domain, and the colors highlight how much the domain is critical with respect to the ad quality rating.

The suggestions provided by the systems in the exemplary embodiments are structured as follows. Features are clustered into feature-domains, where each feature domain gathers features which are semantically related. Examples are textual features, media-based features, etc. For each feature domain, the system provides its importance on dwell time, referred to as domain-importance. This information allows the advertisers to understand which dimensions are the main dimensions that affect dwell time and hence prioritize improvement. For each feature-domain the system provides domain-specific suggestions, which in the exemplary embodiment is a list of recommended actions on features in the considered domain to improve the engagement of the considered ad.

In some embodiments, the ad-quality rating is computed by analyzing the predicted distribution of dwell time for the given ad and comparing it to the one achieved by similar ads. Other factors, besides dwell time, may be used instead or in computing the ad quality rating.

Ads with different content are likely to perform in a different way. Some contents are inherently more engaging than others or require a different time to lead to a conversion. To take into account this phenomenon, low-quality ads are considered as the ones for which the mass of the predicted distribution of dwell time is shifted towards low values, if compared to the one of similar ads. Similarity is computed by clustering ads into a set of classes or categories by considering their textual content. Note that for sponsored search, the similarity might be improved by including additional information such as query and bid terms.

However, without loss of generality, a solution is presented by assuming that all the ads fall within the same category so that the technique can be generalized to the case of multiple categories. Given the feature-representation of each ad, the system predicts its distribution over the dwell time and compares it with historical statistics of ads in the same category. At the end of this step, the ad is labeled as low, medium or high quality. The recommended list of features to improve for a low-performing ad is generated by selecting a set of features whose values consistently diverge from average values measured on high-quality ads.

The framework for estimating the ad quality rating consists of an offline and an online component. Specifically, the computation of the quality rating requires a training step that is performed offline, whereas for each new ad coming into the platform we use the trained model to output online the value of its rating and generate possible suggestions for its improvement. First, we introduce the notation used hereinafter in this document.

Let $A=\{a_1, \ldots, a_M\}$ be a set of M ad landing pages, and let $C=\{c_1, \ldots, c_N\}$ be a set of N topical categories. We assume the existence of a bijective function $f:A \mapsto C$ that maps each and every ad landing page to exactly one category. Therefore, we define $A^{(j)} \subseteq A$ as the subset of all the ad landing pages which map to the j-the category, i.e.: $A^{(j)}=\{a_i \in A | f(a_i)=c_j\}$. It turns out that f induces a partition of the original set A, namely: $A=\cup_j A^{(j)}$ and $A^{(j)} \cap A^{(h)}=\emptyset \forall j \neq h$.

Furthermore, we associate a random variable $X_i$ to each ad landing page $a_i$: $X_i$ represents the dwell time on $a_i$; in addition, we consider a sample of $n_i$ i.i.d. random variables: $X_{i,1}, \ldots, X_{1,ni}$, where each $X_{i,k}$ represents the dwell time of the k-th click on $a_i$. Finally, we denote by $x_{i,k}$ the actual value observed for $X_{i,k}$. On top of that, we denote by Med(Xi) the sample median of the dwell time of $a_i$, namely the median dwell time computed from the sample of $n_i$ observations:

$$\{X_{i,1}=x_{i,1}, X_{i,2}=x_{i,2}, \ldots, X_{i,ni}=x_{i,n_i}\}.$$

As we need also to operate at the category level, the same statistic can be aggregated across all the landing pages belonging to the same category. Essentially, there are two ways of computing such an aggregate: micro-median and macro-median. The former computes the aggregate median dwell time across all the landing pages of the j-th category by just considering all the observations as if they were coming from a single landing page. That is, for each subset $A^{(j)}$ it builds a new random variable $Y_j$, which is the union of all the random variables associated with all the landing pages in the j-th category, i.e., $Y_j=\{X_{i,k}\}_{k=\{1, \ldots, n_j\}, a_i \in A^{(j)}}$. Note that this is not a real union set operation as duplicates are not removed. The latter, instead, firstly computes the median from each sample of dwell times as observed for each landing page in the category and then defines a new random variable $Y_j$ as follows: $Y_j=\{Med(X_i)\}_{a_i \in A^{(j)}}$. In any case, the aggregated sample median is computed as Med($Y_j$). It turns out that the macro-median is more robust than the micro-median because the latter may suffer from categories having landing pages with highly imbalanced number of observations, therefore the resulting aggregated median could be biased towards those landing pages which have been far more clicked than others.

Figure 3:
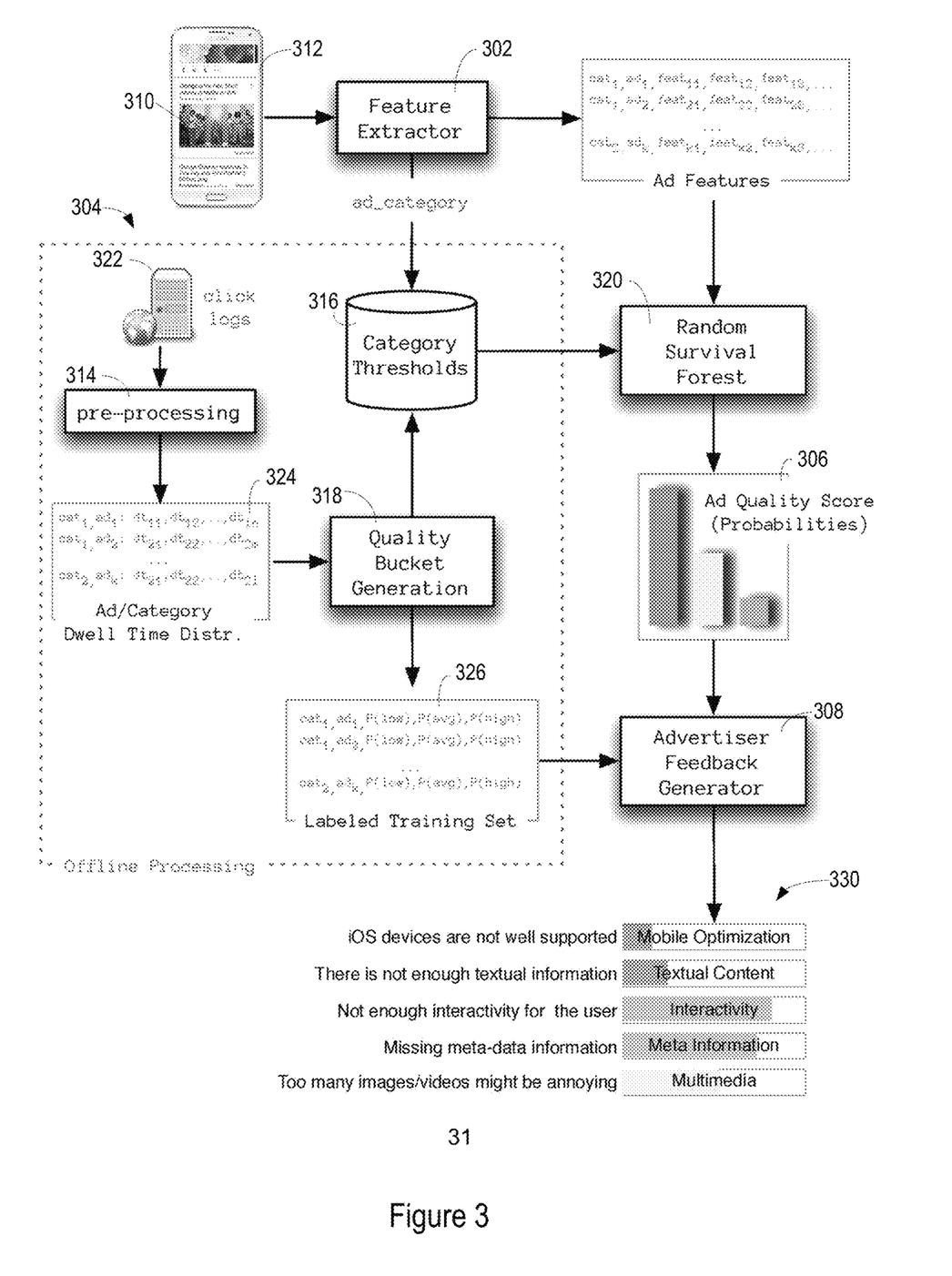
FIG. 3 is a block diagram of a system 300 for generating suggestions to improve user interaction with online advertisements.

FIG. 3 is a block diagram of a system 300 for generating suggestions to improve user interaction with online advertisements. The system 300 includes a feature extractor module 302, a dwell time prediction module 304, an ad quality rating module 306 and a suggestion generator 308. The system provides a quality rating for an advertisement of interest and provides suggestions for improvement of the landing page associated with the advertisement of interest. FIG. 3 also includes advertiser suggestions 330.

The modules illustrated in FIG. 3 may be implemented in any suitable fashion and by any suitable device. For example, the modules may be implemented by an analytic server that collects data about advertisements and performs analytical operations to track ad performance and user interactions with advertisements, and provide reports, analysis and processed information. The modules may be implemented by hardware or software or any combination. The hardware may include circuits to perform the functions described herein, as well as other supporting functions. The circuits may include general purpose data processors and memory components which store data and instructions to cause the data processors to perform the described function. The circuits may include specialized digital and analog circuitry configured or adapted to perform the noted functions. Further, the modules may include one or more software routines which have been specifically written or adapted to perform the noted functions.

Feature Extraction

As indicated in FIG. 3, the feature extractor module 302 receives a landing page as an input. The landing page is the web page to which a user's web browser is redirected upon clicking an advertisement. In the illustration of FIG. 3, the landing page is exemplified as the page 310 that would be rendered by the web browser on a user's client device, in this case, smartphone 312. In other embodiments, the landing page may be the page to which a tablet computer, laptop computer or desktop computer may be redirected upon clicking the advertisement. The landing page for each client device may have a different format to emphasize different features because of differing capabilities of each client device. Thus, a landing page for a mobile device such as smartphone 312 may have less text and graphics to reflect the smaller screen size of the smartphone 312 for displaying information. The feature extractor 302 is operative to receive substantially any landing page regardless of the client device for which it is formatted.

The feature extractor module 302 takes as input the landing page 310 associated with each ad and computes a set of features. Examples of the features identified and processed by the feature extractor module 302 include the number of links on the landing page 310, the dimension of the text of the landing page 310 and the number of images on the landing page 310. The output of the feature extractor module 302 is a feature-representation of the ad, which specifies a value for each feature. For example, the feature-representation may specify that number of images on the landing page 310 is 3. Any number of features may be identified by the feature extractor module and the nature of the features may vary with the content of the landing page 310. For example, if multimedia files are contained in or linked by the landing page 310, the extracted features may include MPEG audio files or video files. The feature extractor module may be adapted to process any type of feature that may appear on a landing page such as the landing page 310 and any number of such features.

In accordance with some embodiments, features are grouped into several domains. Example domains include mobile optimization: features that describe how well the web page supports mobile navigation. Examples are window_size, view_port, and media_support;

multimedia: features related to multimedia objects such as pictures or videos;

textual content: features related to the format and semantic properties of the textual content;

interactivity: features related to the presence of forms which prompt for users' information; and meta information: features extracted from the title and header of the landing page. Examples include description text, keywords and title.

These feature domains are intended to be exemplary only. Other features may be grouped into other domains as well or in the alternative.

As illustrated in FIG. 3, the output from the feature extractor module 302 is an ordered set of ad features. In the example of the figure, the features are organized by category, advertisement and by feature.

Dwell Time Prediction

The dwell time prediction module 304 includes a pre-processor 314, category threshold store 316, quality bucket generation module 318 and random survival forest module 320. One goal of the dwell time prediction module 304 is to predict the distribution of dwell time, given a training set composed of ad features and dwell time measured on historical data.

The pre-processor 314 is in data communication with a click log store 322. The click log store 322 may generally be one or more components of the online advertising system and stores in memory data from past operations of the online advertising system. For example, each time an advertisement is shown to a user or communicated to a client device, an impression is recorded for that advertisement. Each time a click through occurs for the advertisement, such as when a user of the client device clicks on the ad to redirect the user's browser to the advertiser's landing page, a click through is recorded in the click log store 322. The stored information may generally be referred to as click logs. Various items of information may be recorded with each click log such as identification information for the advertiser and user, the network address of the landing page, time stamp information, geographical information and any other information that may be available and valuable. For example, stored records may include time stamps for the time when the client device browser was redirected to the landing page and for when the client device browser navigated away from the landing page. From such time stamp information, dwell time can be measured or estimated.

The pre-processor 314 retrieves training data records from the click log store 322 for each ad. The retrieved training data records include dwell times corresponding to each clicked impression. In some instances, this data is extremely skewed. Accordingly, the pre-processor 314 operates to remove observations corresponding to accidental clicks. The output of the pre-processor 314 in the illustrated example is an ordered array of data organized by advertisement category, advertisement and dwell time values. The data produced by the pre-processor 314 is referred to as the ad/category dwell time distribution 324.

The pre-processor 314 provides the ad/category dwell time distribution 324 to the quality bucket generation module 318. The quality bucket generation module 318 computes the median of the dwell times for each ad. The quality bucket generation module 318 computes a labelled training set 326. The labelled training set 326 is an ordered array of data organized by advertisement category, advertisement and the threshold values that define the quality buckets labelled low, average and high. The labelled training set 326 may be stored in the category threshold store 316. Given a training set composed of pairs of (ad-feature, dwell time), the random survival forest module 320 is a machine learning module configured to predict the distribution of the dwell time given the feature representation of the ad. The operations of the dwell time prediction module 304 may be performed offline, as illustrated in FIG. 3.

The training step makes use of the historical ad click logs collected from the large-scale data warehouse represented by the click log store 322. In addition, a content analysis web service such as the Yahoo Context Taxonomy (YCT) or similar service may be used to group ad landing pages into a predefined set of topical categories. The YCT is a base level content taxonomy supporting automated categorization of various content objects such as news articles, queries, advertising keywords, tweets, web pages, etc. through a set of automated machine learning classifiers. Specifically, we assign to each ad landing page the category automatically provided by YCT. This coincides with the bijective function f introduced above.

It is worth noting that the same might be obtained by manually labelling each ad landing page, or by using any unsupervised learning strategy, such as clustering, which exploits a similarity metric between the ad landing pages. However, the approach using YCT or a similar content analysis web service may be more accurate as it has been extensively tested, and more efficient as it does not require any human intervention nor defining a similarity metric. Plus, using YCT has enabled validation of an assumption that ad landing pages belonging to the same category exhibit similar distributions of observed dwell time. Moreover, we have observed that dwell times of ad landing pages that belong to different YCT categories highly likely come from different underlying distributions. To assess this claim we perform the following steps:

For each pair of subsets $(A^{(j)}, A^{(h)}) \forall (j,h) \in A, j \neq h$; we test whether the difference of the median dwell time computed from two random samples $S_j$ and $S_h$ drawn from each subset, i.e. $|Med(S_j) - Med(S_h)|$, is statistically significant.

For each pair of subsets $(A^{(j)}, A^{(j)}) \forall j \in A$ we test whether the difference of the median dwell time computed from two random samples $S_{j1}$ and $S_{j2}$ drawn from the same subset, i.e. $|Med(S_{j1}) - Med(S_{j2})|$, is not statistically significant.

The training step makes use of the historical ad click logs collected from the large-scale data warehouse represented by the click log store 322. In addition, a content analysis web service such as the Yahoo Context Taxonomy (YCT) or similar service may be used to group ad landing pages into a predefined set of topical categories. The YCT is a base level content taxonomy supporting automated categorization of various content objects such as news articles, queries, advertising keywords, tweets, web pages, etc. through a set of automated machine learning classifiers. Specifically, we assign to each ad landing page the category automatically provided by YCT. This coincides with the bijective function f introduced above.

It is worth noting that the same might be obtained by manually labelling each ad landing page, or by using any unsupervised learning strategy, such as i.e. clustering, which exploits a similarity metric between the ad landing pages. However, the approach using YCT or a similar content analysis web service to be more accurate as it has been extensively tested, and more efficient as it does not require any human intervention nor defining a similarity metric. Plus, using YCT has enabled validation of an assumption that ad landing pages belonging to the same category exhibit similar distributions of observed dwell time. Moreover, we have shown that dwell times of ad landing pages that belong to different YCT categories highly likely come from different underlying distributions. To assess this claim we perform the following steps:

For each pair of subsets $(A^{(j)}, A^{(h)}) \forall (j,h) \in A, j \neq h$; we test whether the difference of the median dwell time computed from two random samples $S_j$ and $S_h$ drawn from each subset, i.e. $|Med(Sj) - Med(S_h)|$, is statistically significant.

More precisely, we run the Mann-Withney-U test, whose null hypothesis $H_0$ states that, given two samples, there is a 50% chance for any observation on one sample to be larger than any other observation on the other sample. To put it formally, $H_0: P(S_j=s_j > S_h=s_h) = 0.5$. We then test for evidence against the null hypothesis at a significance level $\alpha=0:05$.

In the first case, we find enough evidence to reject the null hypothesis at $\alpha$, and therefore we conclude that the median dwell time computed from observations drawn from ads on different YCT are significantly different. On the other hand, we can never reject the null hypothesis which, though does it not imply accepting it, suggests that probably the median dwell time computed for ads in the same YCT are not that different. Having verified that YCT represents a good way of grouping together ad landing pages leading to similar post-click experience, we pre-process the ad click log data. This is done in the pre-processor 314.

Figure 4:
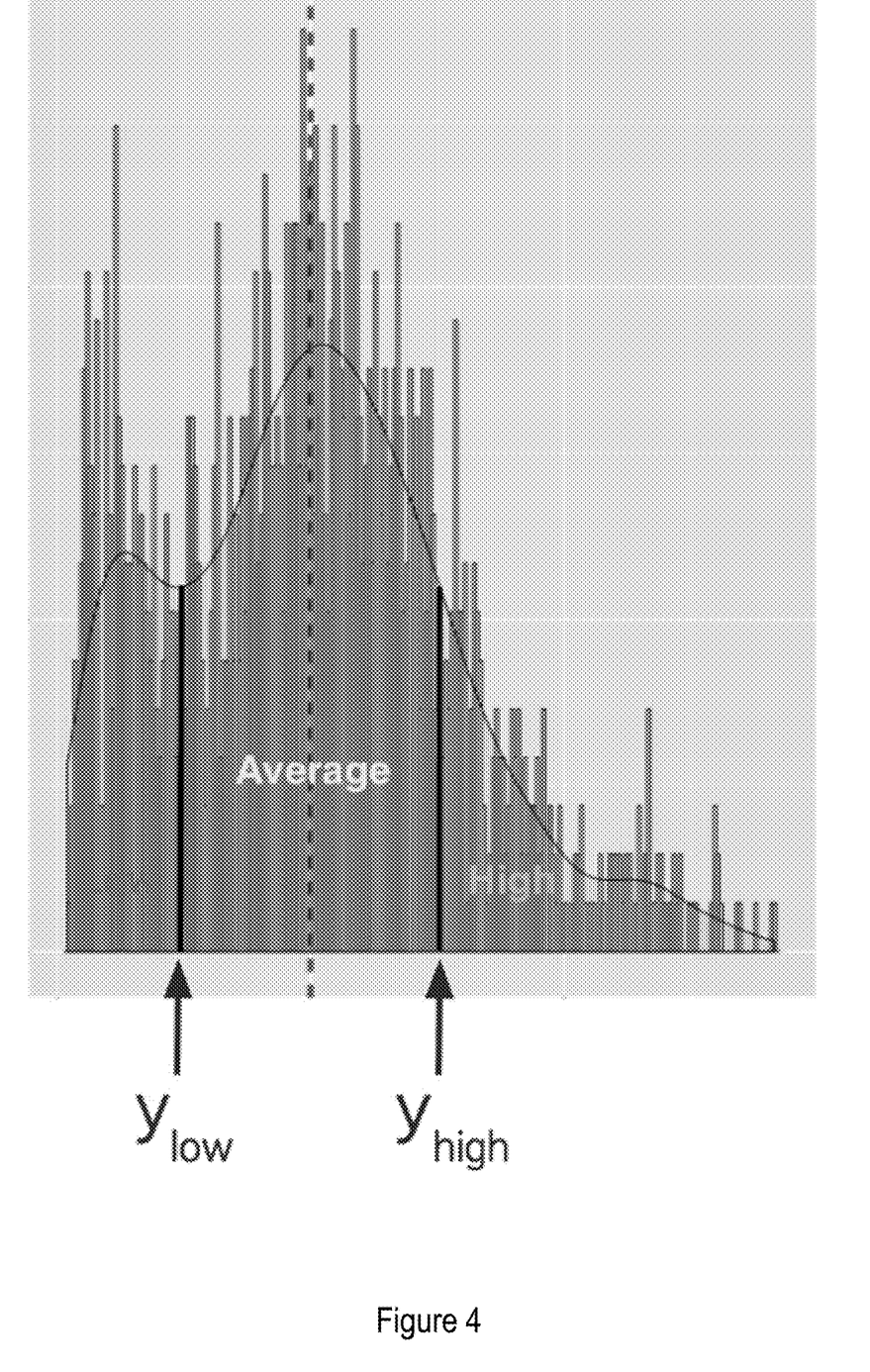
FIG. 4 is a plot of distribution of the median dwell time for web pages similar to an ad landing page under consideration.

Firstly, we remove all those dwell times that are attributed to accidental clicks. To perform this step we calculate a per-YCT threshold on accidental clicks. For each YCT j we therefore consider the distribution of the median dwell time of all the landing pages referring to j as depicted in FIG. 4. FIG. 4 is a plot of distribution of the median dwell time for web pages similar to an ad landing page under consideration. Note that this is equivalent to the random variable $Y_j$ associated with the macro-median as described previously in this section. The two critical values denoted by $y_{low}$ and $y_{high}$ naturally define three ad quality buckets on the probability distribution of $Y_j$. For example, $y_{low}$ and $y_{high}$ could be set to the first and the third quartile of the distribution, i.e. $y_{low} = \{y^* | P(Y_j \leq y^*) = 0.25\}$, $y_{high} = \{y^* | P(Y_j \leq y^*) = 0.75\}$, meaning that a landing page is labelled as low quality if its median dwell time is below the 25% of the distribution, it is high quality if the median dwell time is above the 75% of the distribution, and finally it is considered as average quality if the median dwell time is in between. The problem then reduces to estimate suitable values for $y_{low}$ and $y_{high}$, which thereby represent the thresholds delimiting the quality buckets.

To estimate the critical values for each YCT category, in fact a confidence interval of each of those estimates, we adopt the following procedure. FIG. 5 illustrates an algorithm which evaluates the confidence interval of the estimated q-th percentile of the per-YCT dwell time distribution.

At the end of this process we have two confidence intervals (i.e. one for each critical value $y_{low}$; $y_{high}$) for each YCT category j: $\{(y_{lowj} \in_{lowj}; y_{highj} \in_{highj})\}, j=1, \ldots, N$. Data defining these confidence intervals may be stored in the category thresholds store 316 (FIG. 3.

Generating a Quality Rating

We therefore feed the above per-YCT thresholds from the category thresholds store 316 into the Random Survival Forest (RSF) model 320. The RSF model may be implemented in any suitable fashion, such as by programming one or more processors with appropriate data and instructions. Without loss of generality, the RSF model uses survival analysis to model the probability of an event to occur at a given time t knowing that it has not occurred up to the time t-1. More formally, it aims at estimating the survival function defined as $S(t)=P(T>t)$, where t is the time and T is a random variable representing the occurring time of an event of interest. In our case, T represents exactly the dwell time as it can be seen as the time of the event "user leaves the ad landing page." In addition, the survival function is learned from the feature-based representation of a set of ad landing pages. Concretely, we assume there exists a function $\phi$ which maps any ad landing page to a d-dimensional feature space, that is $\phi: A \mapsto F$, where $F \subseteq \mathbb{R}^d$. Therefore $\phi(a) = (f_1, \ldots, f_d)^T \in F$ is the feature vector associated with the ad landing page a. This means that in our case $S(t)=P(\phi(a)>t)$. Additional details on survival analysis and RSF are well known to those of ordinary skill in the art. For the sake of most embodiments, however, the RSF model 320 may be considered to simply implement a function in which, given a time threshold t and a feature-based representation of an ad landing page (including the YCT category), the RSF function provides as output the probabilities 306 of the dwell time of that landing page being above the threshold t. We can thus use this tool in order to generate our per-YCT ad quality rating. We extract the features $\phi(a)$ for each ad in a given YCT and we consider the confidence intervals which defines the quality buckets of that particular YCT. Let $(y_{low} \pm \epsilon_{low}; y_{high} \pm \epsilon_{high})$ be the two confidence intervals for the generic YCT category. Then, we use the RSF model already trained to provide us with the following two probabilities:

$$P(\phi(a) > y_{low} \pm \epsilon_{low})$$

$$P(\phi(a) > y_{high} \pm \epsilon_{high})$$

The latter exactly corresponds to the probability of the ad landing page of having a high quality score, i.e. $P(a=\text{HIGH}) = P(\phi(a) > y_{high} \pm \epsilon_{high})$. From the former, instead, it can be derived the probability of the ad landing page being low quality, i.e. $P(a=\text{LOW}) = 1 - P(\phi(a) > y_{low} \pm \epsilon_{low})$. Finally, for the axiom of probability $P(a=\text{AVG}) = 1 - [P(a=\text{HIGH}) + P(a=\text{LOW})] = 1 - [P(\phi(a) > y_{high} \pm \epsilon_{high}) + 1 - P(\phi(a) > y_{low} \pm \epsilon_{low})] = 1 - P(\phi(a) > y_{high} \pm \epsilon_{high}) - 1 + P(\phi(a) > y_{low} \pm \epsilon_{low})] = P(\phi(a) > y_{low} \pm \epsilon_{low}) - P(\phi(a) > y_{high} \pm \epsilon_{high})$.

Finally, we can think of the quality rating of an ad a as the $\max\{P(a=\text{LOW}), P(a=\text{AVG}), P(a=\text{HIGH})\}$. Of course, there might be some edge cases where $\{P(a=\text{LOW}) = P(a=\text{AVG}) = P(a=\text{HIGH})\}$, namely the rating for an ad is uniformly distributed over the three quality buckets. Although this is rare in practice, it means that there is still room for improvements on the ad quality, and therefore actionable suggestions on how to achieve that should be anyway provided.

Suggestions for Quality Improvements

So far, a statistically sound method has been described to estimate the post-click ad quality rating using the feature-based representation of its landing page. The advantage of having an ad quality rating is twofold. On one hand, the publisher such as Yahoo can use it as an additional signal to re-rank the ads to be shown to the user so to optimize for quality and expected revenue at serving time. On the other hand, if properly wrapped into a usable tool, the quality rating can be of great interest to advertisers. In fact, it could be used by advertisers to monitor the behavior of their running campaigns from the post-click (i.e. user engagement) standpoint. In addition, the publisher can provide advertisers with some actionable suggestions on how to improve the quality of an ad, without however unveiling any sensible detail on how the rating is internally computed.

In FIG. 3, the advertiser feedback module generator 308 generates those suggestions on top of the quality rating. We assume a new ad a' is received into the system 300. As there is no historical information about the new ad, such as dwell time observations, for a, this represents a classical cold start problem. However, assume that we are able to extract a feature-based representation of a', which is φ(a'). Moreover, the feature representation contains also the YCT category associated with the new ad. Therefore, by knowing the YCT we also know what are the two confidence intervals of the critical value estimates for that category, e.g., ($y_{low} \pm \epsilon_{low}$, $y_{high} \pm \epsilon_{high}$). In other words, we eventually know the quality score for a' by simply feeding our running RSF model with φ(a') as well as the appropriate thresholds delimiting the quality buckets.

Assume that a' has a very low quality score, namely P(a=Low)≥P(a=High)+P(a=Avg). On the other hand, let us take all the ads in the same YCT of a' that instead have a high quality score, namely the set of ads $A_{high}$={a*∈A|P(a*=High)≥P(a*=Low)+P(a*=Avg)}. From each of those ads, we compute the confidence interval of the median of each individual feature in the d-dimensional space. More formally, we derive [Med({$f_{i,a*}$}$_{a* \in A_{high}}$)±$\epsilon_i$]$_{i=1, \ldots, d}$. Therefore, we compare the value of each feature $f_{i,a'}$ with the corresponding confidence interval for the i-th feature computed as above. Three cases may then occur:

$f_{i,a'}$<Med({$f_{i,a*}$}$_{a* \in A_{high}}$−$\epsilon_i$): the i-th feature of a' is outside the confidence interval to the left;

$f_{i,a'}$>Med({$f_{i,a*}$}$^{a*} \in A_{high}$−$\epsilon_i$): the i-th feature of a' is outside the confidence interval to the right;

$f_{i,a'}$∈[Med({$f_{i,a*}$}$_{a* \in A_{high}}$+$\epsilon_i$)]: the i-th feature of a' is within the confidence interval.

The magnitude of the distance of each feature with respect to the corresponding confidence interval is 0 if the feature ranges within the interval, or it is the value of the difference between the feature itself and the leftmost (rightmost) extreme of the interval if the feature falls outside-left (outside-right) from the range.

Assuming the features are properly normalized, we finally rank them by the absolute value of the distance magnitude above in non-increasing order, so that the top feature is the one having the larger distance from the corresponding confidence interval.

The final set of suggestions is generated by inspecting the top-k features of the ranking and taking also into account the sign of the distance. For example, if we derive that the confidence interval of the feature num_of_images for high-quality landing pages is [3±1], any new ad landing page having 5 or more images induces the system to suggest the advertiser to reduce the number of images. Vice versa, for any ad landing page having 1 or no images at all, the system may recommend the advertiser to increase this value.

Two aspects are worth noting. Firstly, the suggestions provided should not be too narrow, e.g., in the example above we do not want to recommend the advertiser to choose a precise number of images but only warn which side the current value of the feature is outside from the high-quality range. Secondly, this approach for providing suggestions takes into account each feature individually and independently from each other. As such, it disregards any possible correlation (either positive or negative) between the features and the quality rating. The current solution is very robust.

FIG. 3 also shows exemplary advertiser suggestions 330. The advertiser suggestions 330 in this embodiment include a list of actionable guidelines that can improve the expected dwell time of the ad. Further, the list of actionable guidelines, if acted upon may also improve the conversion rate for the ad.

The exemplary advertiser suggestions 330 are to be shown to advertisers. In this example the advertiser suggestions include a sentence that points out the direction of the improvement, the category name inside the horizontal box, and a colored box or other graphical feature that highlights the level of that particular feature class. The color of the box may be chosen to indicate relative importance of the suggestion. Other suggestion formats may be used as well.

In the illustrated example, the categories around which the suggestions are built include mobile optimization, textual content, interactivity, meta information and multimedia. These respective category names are placed inside respective boxes and the boxes are colored, for example red, yellow and green as a visual indicator of the importance of the suggestion. Further, a textual explanation of the proposed suggestion is provided.

In some embodiments, and as illustrated in the drawing features are clustered into feature-domains, where each domain gathers features semantically related, such as textual features, media-based features, etc. For each feature domain, the system provides its importance on dwell time (domain-importance). This information allows the advertisers to understand which dimensions primarily affect dwell time. This also allows the advertisers to prioritize improvements. Suggestions in this format are easy to understand and rapidly put into place. Further, the advertiser can understand which elements of the ads are more or less effective.

From the foregoing, it can be seen that the present invention provides for generation of actionable suggestions to advertisers which will permit improvement of user engagement with online advertisements. The disclosed system implements these advancements and focuses on the post-click user experience, after the user has clicked on an advertisement and her browser has been redirected to an ad landing page. Dwell time is the time spent by the user on the landing page, and it has been shown to be correlated to the conversion capturing better the degree of users' engagement with the ad. Historical user behaviors and features extracted from each landing page are keys to building the ad-quality rating. Moreover, a similarity metric is applied to find similar ads based on the landing page, making the approach widely flexible. In the case of sponsored search, the bid terms and the query can be used to improve the similarity metric.

Another important advantage of the present disclosure is that the estimation of the rating can be performed even before the ad runs live on the platform. This allows the hosting platform to early detect low quality ads that could impact negatively on users. The ad-quality rating is complemented with a set of suggestions that can be used to explain to the advertiser the rating, promoting interpretability, and to improve the format of the ad. The generation of the interpretable suggestions, which serve as guidelines for the advertisers, is a significant novelty in the field. These actions, if applied, will likely increase the user engagement on the landing page and as a consequence the conversion rate.

It is therefore intended that the foregoing detailed description be regarded as illustrative rather than limiting, and that it be understood that it is the following claims, including all equivalents, that are intended to define the spirit and scope of this invention.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

The invention claimed is:

1. A computer system comprising:
a circuit to receive data defining an advertisement from an advertiser;
a feature extraction circuit configured to:
receive, based upon the data defining the advertisement, data defining an ad landing page associated with the advertisement;
identify a set of features of the ad landing page; and
produce a feature representation of the ad landing page associated with the advertisement and a set of ad categories based upon the set of features, wherein producing the feature representation comprises determining one or more values for one or more features including at least one of a first value indicative of a number of images on the ad landing page or a second value indicative of a number of links on the ad landing page;
a second circuit operative to receive historical dwell time data from one or more computers;
a dwell time prediction circuit operative to predict a distribution of dwell times for the advertisement using the set of ad categories and the historical dwell time data;
an ad quality rating generation circuit operative to compute a quality rating for the advertisement based upon (i) the feature representation, of the ad landing page associated with the advertisement, comprising at least one of the first value indicative of the number of images on the ad landing page or the second value indicative of the number of links on the ad landing page and (ii) the distribution of dwell times; and
a suggestion circuit operative to:
determine suggestions for improving the advertisement using the quality rating for the advertisement and a target range; and
provide the suggestions to the advertiser as feedback on ad performance to improve future performance of the advertisement.

2. The computer system of claim 1 wherein the feature representation comprises the first value indicative of the number of images on the ad landing page, wherein computing the quality rating is based upon the first value, of the feature representation, indicative of the number of images on the ad landing page.

3. The computer system of claim 1 wherein the feature representation comprises the second value indicative of the number of links on the ad landing page, wherein computing the quality rating is based upon the second value, of the feature representation, indicative of the number of links on the ad landing page.

4. The computer system of claim 1 wherein the ad quality rating generation circuit operates to identify a topical category of the ad landing page and operates to identify similar advertisements as advertisements having a same topical category.

5. The computer system of claim 4 comprising a communication circuit operative for data communication with a content analysis web service, wherein the computer system is operative to communicate the ad landing page to the content analysis web service and to receive the topical category of the ad landing page in return from the content analysis web service.

6. The computer system of claim 1 wherein providing the suggestions comprises providing, for display, a first actionable guideline and a second actionable guideline, wherein the first actionable guideline comprises first text indicative of a first suggestion and a first graphical representation of a first level of a first feature of the advertisement, wherein the second actionable guideline comprises second text indicative of a second suggestion and a second graphical representation of a second level of a second feature of the advertisement, wherein the first suggestion is associated with the first feature and the second suggestion is associated with the second feature.

7. The computer system of claim 1 wherein the feature extraction circuit operates to group features of the set of features of the ad landing page into two or more feature domains, and wherein the suggestion circuit operates to provide to the advertiser a set of suggestions, each suggestion of the set of suggestions corresponding to one feature domain of the two or more feature domains.

8. The computer system of claim 1 wherein providing the suggestions comprises providing, for display, a first actionable guideline and a second actionable guideline, wherein the first actionable guideline comprises a first graphical representation of a first level of a first feature of the advertisement, wherein the second actionable guideline comprises a second graphical representation of a second level of a second feature of the advertisement.

9. The computer system of claim 8 wherein the first graphical representation comprises a first color associated with a first level of importance and the second graphical representation comprises a second color associated with a second level of importance.

10. A method comprising:
receiving from an advertiser an advertisement to be displayed on an advertising system;
receiving historical dwell time data from one or more computers;
predicting a dwell time for the advertisement based upon the historical dwell time data;
extracting features associated with the advertisement, wherein the features comprise a feature representation of an ad landing page associated with the advertisement, wherein the feature representation comprises one or more values for one or more features including at least one of a first value indicative of a number of images on the ad landing page or a second value indicative of a number of links on the ad landing page;
determining a quality rating for the advertisement based upon (i) the dwell time for the advertisement and (ii) the feature representation of the ad landing page associated with the advertisement;
determining suggestions for improving the advertisement using the quality rating for the advertisement; and
providing the suggestions to the advertiser.

11. The method of claim 10 wherein the feature representation comprises the first value indicative of the number of images on the ad landing page.

12. The method of claim 10 wherein the feature representation comprises the second value indicative of the number of links on the ad landing page, wherein determining the quality rating is based upon the second value, of the feature representation, indicative of the number of links on the ad landing page.

13. The method of claim 10 wherein providing suggestions to the advertiser for improvements comprises providing to the advertiser a list of actionable guidelines that can improve expected dwell time of the advertisement.

* * * * *